(12) United States Patent
Suszko (10) Patent No.: US 7,760,628 B2
(45) Date of Patent: Jul. 20, 2010

(54) SOCKET BASED PASSIVE SERVER

(75) Inventor: August J. Suszko, Encinitas, CA (US)

(73) Assignee: Kyocera Corporation, Kyoto (JP)

( * ) Notice: Subject to any disclaimer, the term of this patent is extended or adjusted under 35 U.S.C. 154(b) by 456 days.

(21) Appl. No.: 11/535,392

(22) Filed: Sep. 26, 2006

(65) Prior Publication Data

US 2008/0075048 A1    Mar. 27, 2008

(51) Int. Cl.
*G01R 31/08*    (2006.01)
*G06F 11/00*    (2006.01)

(52) U.S. Cl. .................. 370/230; 370/352; 370/395.21

(58) Field of Classification Search ................. 370/352, 370/389
See application file for complete search history.

(56) References Cited

U.S. PATENT DOCUMENTS

| | | | | |
|---|---|---|---|---|
| 6,058,289 | A * | 5/2000 | Gardner et al. ............. | 340/7.32 |
| 6,324,564 | B1 | 11/2001 | Thielke et al. | |
| 6,526,281 | B1 | 2/2003 | Gorsuch et al. | |
| 6,622,251 | B1 * | 9/2003 | Lindskog et al. ............ | 713/300 |
| 7,096,494 | B1 * | 8/2006 | Chen .............................. | 726/9 |
| 2003/0100310 | A1 | 5/2003 | Lindner et al. | |
| 2005/0078604 | A1 | 4/2005 | Yim | |
| 2005/0288045 | A1 | 12/2005 | Yang et al. | |
| 2006/0098651 | A1 | 5/2006 | Joh | |
| 2006/0109846 | A1 | 5/2006 | Lioy et al. | |
| 2007/0202941 | A1 * | 8/2007 | Miltenberger et al. ......... | 463/25 |

FOREIGN PATENT DOCUMENTS

EP    1 655 985    5/2006
WO    WO 2005/101765    10/2005

\* cited by examiner

*Primary Examiner*—Ayaz R Sheikh
*Assistant Examiner*—Mounir Moutaouakil (57) ABSTRACT

A socket module on a wireless communication device is provided that establishes and maintains open UDP sockets with a remote server over a wireless communication network and manages the dormancy state of the radio link to the wireless communication network. The state of the radio link may be either active or dormant and the socket module keeps the UDP socket open even when the state of the radio link is dormant, thereby reducing setup time for communications between the wireless device and the remote server. The socket module is configured to maintain multiple open sockets for a plurality of applications that may run on the wireless device and thereby operate as a passive server for such applications on the wireless device.

10 Claims, 3 Drawing Sheets

SOCKET BASED PASSIVE SERVER

FIELD OF THE INVENTION

The present invention generally relates to the field of wireless communications and more specifically relates to UDP socket data transfers using dormancy over a cellular network between a wireless communication device and network based server.

BACKGROUND

Conventional wireless data communications between a wireless communication device and a network based server lack the dependability and speed demanded by the increasingly sophisticated applications that run on wireless communication devices today or are deployed in the field as a specific purpose wireless device and accessed via a wireless communication network. For example, wireless communication devices are installed in thousands of electric meters across the country to help shed load for the utility. However, to be effective, these remote devices need to be quickly accessible to receive instructions via the wireless communication network.

Current methods of communicating with a remote wireless device include sending an SMS command message or making a voice call to the remote device. Once the remote device receives the command it can respond with a SMS message or initiate a socket data call to the server. SMS by design is a best effort, with no guarantee of delivery and one significant drawback of using SMS is that SMS delivery times can vary from seconds to hours. Voice calls are fast, but are not cost effective and do not allow for any efficient method of data transfer.

In practice, the SMS to SMS technique requires that the server send an SMS message to the remote device and the remote device responds with an SMS message. Because SMS uses best effort delivery the delivery times can vary from seconds to hours. An additional drawback of SMS to SMS messaging is that the length of each SMS message is limited to between 100 and 180 bytes of user data.

Similarly, the SMS to socket technique requires that the server send an SMS message to the remote device and the remote device responds by opening a socket connection to the server. A drawback of opening a socket is that the socket maintenance (opening and closing the socket) creates overhead on the remote device and is time consuming. One advantage of the SMS to socket technique over the SMS to SMS technique is that the socket allows for up to 1500 bytes of data to be sent in each message.

Finally, the Voice to SMS (or socket) technique requires that the server place a voice call to the remote device and the remote device responds by sending an SMS message or opening a socket connection to the server. While conceptually better since the time required for the voice call is short relative to an SMS message, it is not implemented in practice because carriers dislike the added traffic on the voice network for data centric devices. Additionally, the costs associated with the voice calls are prohibitively expensive. Accordingly, the industry has a need for a solution that overcomes these significant problems found in conventional data communications between a wireless communication device and a network based server as described above.

SUMMARY

Accordingly, a passive server is implemented on a wireless communication device that employs UDP socket data transfers and takes advantage of dormancy on the wireless communication link. The use of the UDP socket enables the wireless device and the network based server to maintain an open path for communications as needed. The UDP socket remains open even when the wireless device goes into the dormant state and the radio link is not active. The radio link automatically becomes active when data is sent between the wireless device and the network based server. The time to come out of dormancy is faster than any combination of SMS, UDP sockets, and voice. A socket module on the wireless device is configured to create and maintain the UDP socket on the wireless device and manage the dormancy state of the radio link. The socket module is configured to maintain multiple open sockets for the variety of applications that may run on the wireless device and thereby operate as a passive server for the applications on the wireless device.

Other features and advantages of the present invention will become more readily apparent to those of ordinary skill in the art after reviewing the following detailed description and accompanying drawings.

BRIEF DESCRIPTION OF THE DRAWINGS

The details of certain embodiments, both as to the structure and operation, may be gleaned in part by study of the accompanying drawings, in which like reference numerals refer to like parts, and in which.

DETAILED DESCRIPTION

Certain embodiments as disclosed herein provide for a passive server on a wireless communication device that creates and maintains open UDP sockets with a remote server, regardless of the state of the radio link to the wireless communication network. For example, one method as disclosed herein allows for a socket module to establish a UDP socket with a remote server and keep the socket open even while the radio link on the wireless communication device goes into a dormant state. When data communications resume, the radio link exits the dormant state and becomes active and the wireless device is able to send and receive data communications with no changes to the IP address or other IP communication parameters.

After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 1:
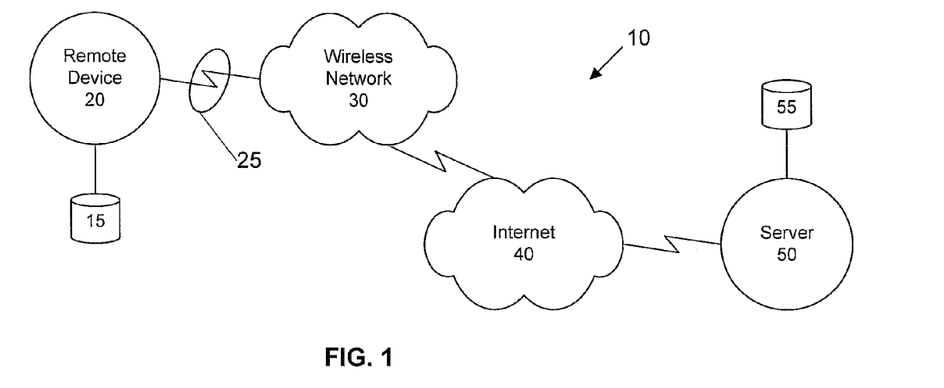
FIG. 1 is a network diagram illustrating a system for wireless data communication according to an embodiment.

FIG. 1 is a network diagram illustrating a system 10 for wireless data communication according to an embodiment. In the illustrated embodiment, the system 10 comprises one or more wireless communication devices such as device 20. The device 20 is communicatively coupled with a wireless communication network 30 via a radio link 25. The wireless communication network 30 is communicatively coupled with a public or private network 40, which may include that particular aggregation of networks commonly known as the Internet. In the illustrated embodiment, the system 10 additionally comprises a server 50 that is connected to the network 40 and communicatively coupled with the wireless communication device 20 via the network 40 and the network 30.

Wireless communication device 20 can be any of a variety of wireless communication devices, including a cell phone, personal digital assistant ("PDA"), personal computer ("PC"), laptop computer, PC card, special purpose equipment, or any combination of these and other devices capable of establishing a wireless communication link over a wireless communication network 30. The wireless communication device 20 may also be referred to herein as a handset, wireless device, mobile device, device, wireless unit, or mobile unit.

The wireless communication network 30 may include a plurality of networks including private, public, circuit switched, packet switched, personal area networks ("PAN"), local area networks ("LAN"), wide area networks ("WAN"), metropolitan area networks ("MAN"), or any combination of the these. Other network types may also be included as needed to facilitate wireless communications between remote device 20 and server 50.

Data storage areas 15 and 55 that are configured with wireless communication device 20 and server 50, respectively, can be any sort of internal or external memory device and may include both persistent and volatile memories. The function of the respective data storage areas 15 and 55 is to maintain data for long term storage and also to provide efficient and fast access to instructions for applications that are executed by the respective devices.

Figure 2:
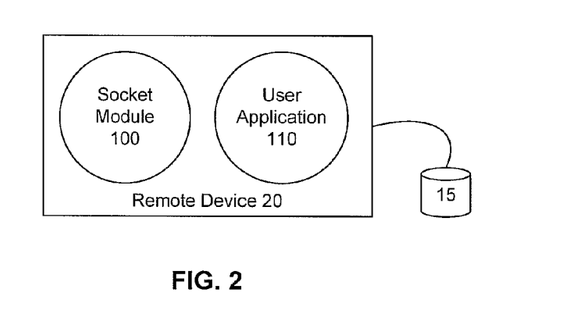
FIG. 2 is a block diagram illustrating an example remote device according to an embodiment.

FIG. 2 is a block diagram illustrating an example remote device 20 according to an embodiment. In the illustrated embodiment, the remote device 20 is configured with a data storage area 15 and the device 20 comprises a socket module 100 and one or more user applications 110.

The socket module 100 is configured to establish a user datagram protocol ("UDP") connection with a remote server (not shown) and send and receive communications with the server on the established socket. The socket module 100 is configured to create the socket by sending the server a message that includes the IP address and the electronic serial number ("ESN") of the remote device 20. In one embodiment, the remote device 20 knows the IP address of the server with which it establishes the UDP socket. In an alternative embodiment, the remote device 20 may use a lookup service or other technique to identify the IP address of the server so that it can establish the UDP socket. Advantageously, the socket module 100 confirms successful creation of a UDP socket by receipt of an acknowledgment message from the server device.

The socket module 100 is further configured to manage the dormancy state of the remote device 20. In one embodiment where the wireless communication network (not shown) uses the CDMA protocol, the dormancy state for the handset identifies whether the radio link between the remote device 20 and the wireless network is active or inactive. Advantageously, when there is no traffic to send or receive, the remote device 20 may go into a dormant state and disable its radio link to the wireless network in order to preserve bandwidth, save cost, and optimize the use of resources on the remote device 20, for example by reducing the drain on the limited battery power of the remote device 20. The socket module 100 is also configured to automatically enable the radio link between the remote device 20 and the wireless network when any data traffic is present to be sent or received.

In one embodiment, the socket module 110 is configured to set a timer for an established UDP socket to control the length of time that the UDP socket remains open. For example, carriers or other managers of wireless communication networks may set a minimum IP lease time. The socket module 110 may advantageously incorporate network settings such as the minimum lease time in order to optimize the connection time the remote device 20 has with the wireless network versus the cost of the connection and/or data charges.

In one embodiment, the one or more applications 110 can be any of a variety of applications including a web browser, text chat service application, video chat service application, word processor, email application, audio, video, or multimedia application or any other type of application that is desirable for deployment on the particular type of remote device 20 to suit its intended purpose or any other purpose. In one embodiment, an application 110 may store the ESN of the remote device 20 but not the IP address, which is maintained by the socket module 100. Additionally, in one embodiment a UDP socket may inherently include the IP address in each socket message.

In one embodiment, applications may be developed with the socket module 110 in mind and therefore such an application 110 may follow the appropriate rules concerning access retries and fallback positions during operation. These applications 110 may also be developed for efficient use of the UDP socket connection with the remote server.

Additionally, applications 110 may be developed so that they monitor the state of the UDP socket and if the socket status is not connected or is dormant the application 110 may initiate closing of the UDP socket and initialization of a new socket. Furthermore, when an open UDP socket receives data, the user application 110 receives a READ event message. If the socket happens to be dormant at that particular time the application can be configured to anticipate a small delay while the UDP socket comes out of dormancy by enabling the radio link between the remote device 20 and the wireless network.

Also, when data is sent by an application 110 on an open UDP socket that is dormant, the application 110 can be configured to anticipate receipt of an appropriate message. For example, in an embodiment where the wireless network is a CDMA network the application 110 would receive an EWOULDBLOCK response to the attempt to send the data. Again, the application 110 can be configured to also anticipate a small delay while the UDP socket comes out of dormancy by enabling the radio link between the remote device 20 and the wireless network. Once the UDP socket is no longer dormant, the application 110 may receive a WRITE event message, after which the application can resend the data.

In one embodiment, user applications 110 may also be configured to use acknowledgment timers so that messages may be resent if receipt is not acknowledged in a timely fashion. Additionally, if a socket appears to not be working, an application 110 can be configured to close the UDP socket and initialize a new UDP socket.

Although many functions are described above as being configured into a user application 110, it should be understood that these functions may also be performed by the socket module 100 in order to provide more robust communication for any type of application 110, whether developed in consideration of the underlying UDP socket communication scheme or not.

Figure 3:
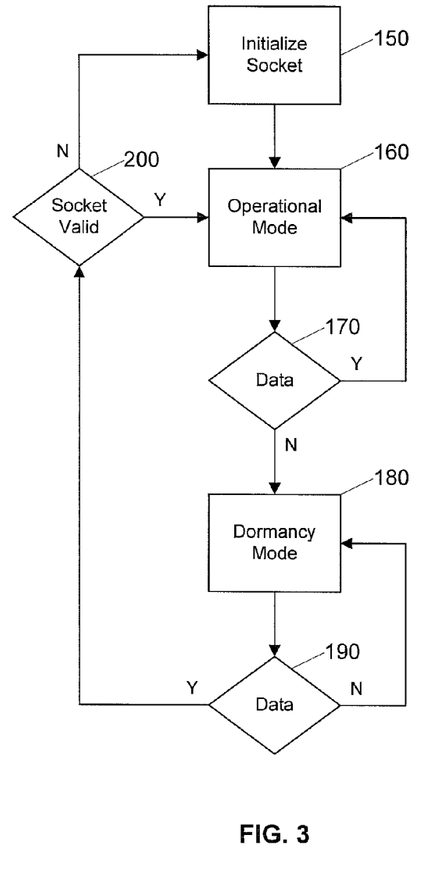
FIG. 3 is a flow diagram illustrating an example process for implementing a passive server according to an embodiment.

FIG. 3 is a flow diagram illustrating an example process for implementing a passive server according to an embodiment. In one embodiment, the process may be carried out by a remote device such as the one previously described with respect to FIGS. 1 and 2. Initially, in step 150 the socket module initializes the UDP socket with the server. This can be accomplished by sending a socket initialization message to the server. In one embodiment, the socket initialization message includes the ESN of the remote device and the IP address of the remote device. Additionally, the remote device may know the IP address of the server device prior to initializing the UDP socket, for example, the IP address may be stored in local memory or hardcoded into an application or the like. Alternatively, the socket module may be configured to dynamically obtain the IP address of the server device, for example by way of a network service lookup or other network request.

Once the UDP socket is established and open, the remote device proceeds into operational mode in step 160 and communications on the UDP socket take place as needed. As determined in step 170, the remote device monitors the data traffic on the UDP socket and if data continues to be sent and received then the remote device remains in operational mode. However, if the data traffic is idle, for example for a certain threshold period of time as determined in step 170, then the remote device proceeds into a dormant mode as shown in step 180. In the dormant mode, the radio link between the remote device and the wireless network is disabled. This advantageously saves both device and network resources and also reduces costs.

While in the dormant state, the remote device continues to monitor the data traffic as shown in step 190 and if there is no data traffic then the remote device remains in the dormant state. However, if the device detects data traffic, as determined in step 190, then the remote device checks the status of the UDP socket in step 200 and if it is still valid the remote device returns to operational mode to carry out the requested data communications.

One significant advantage of using a UDP socket in this process is that UDP sockets are connection-less and therefore may remain open when the link between the two devices is disabled. An additional advantage of using a UDP socket in this process is that when the link is reactivated and the data traffic resumes, the IP address used for routing of data traffic remains for the remote device, which reduces overhead and administrative functions in the overall system. Yet another significant advantage of using a UDP socket in this process is that if the socket is not valid, as determined in step 200, the UDP socket is reinitialized in a return to step 150. This allows the remote device to be the most flexible with respect to its IP address and if the remote device happens to be reassigned a new IP address, the new UDP socket will be established accordingly and use the new IP address and the server will in turn know of the new IP address by virtue of the new UDP socket being initialized.

Figure 4:
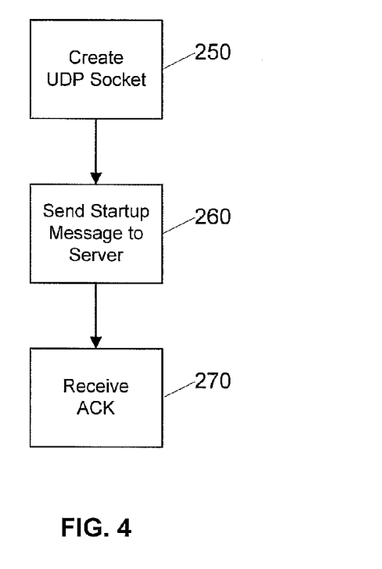
FIG. 4 is a flow diagram illustrating an example process for initializing a passive server on a remote device according to an embodiment.

FIG. 4 is a flow diagram illustrating an example process for initializing a passive server on a remote device according to an embodiment. In one embodiment, the process may be carried out by a remote device such as the one previously described with respect to FIGS. 1 and 2. Initially, in step 250 the remote device creates a UDP socket with the remote server by sending a UDP socket creation message to the remote server, as shown in step 260. In one embodiment, the UDP socket creation message includes the ESN of the remote device as well as the IP address of the remote device. Advantageously, including the IP address of the remote device provides the server with the IP address for any following communications between the remote device and the server. This is particularly advantageous if the UDP socket has to be closed and reinitialized for any reason. In such a case, if the IP address of the remote device has changed for any reason, e.g., dynamic assignment, then the server will have to new IP address of the remote device. Finally, in step 270 the remote device receives an acknowledgment message from the server that confirms that the UDP socket has been established. After establishing the UDP socket, data communications may proceed.

Figure 5:
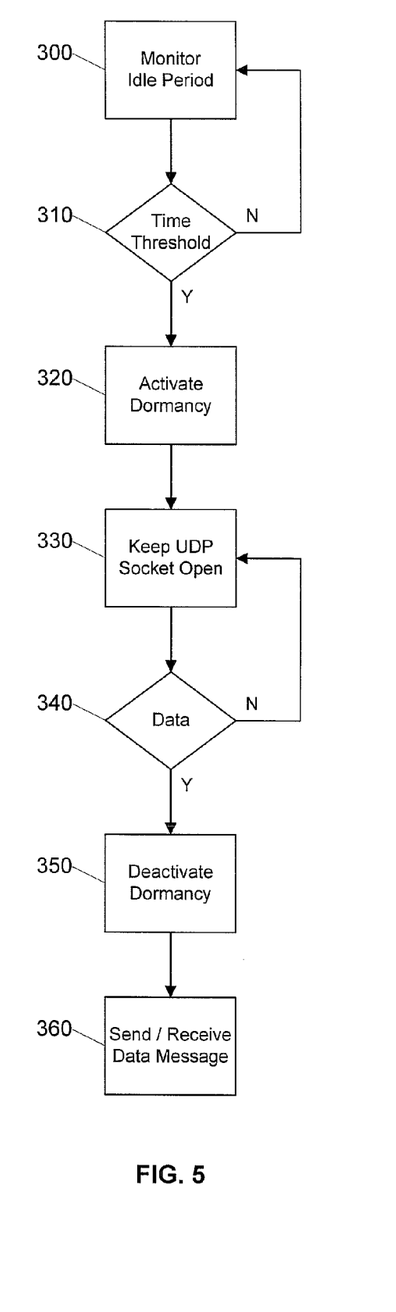
FIG. 5 is a flow diagram illustrating an example process for operating a passive server according to an embodiment.

FIG. 5 is a flow diagram illustrating an example process for operating a passive server according to an embodiment. In one embodiment, the process may be carried out by a remote device such as the one previously described with respect to FIGS. 1 and 2. Initially, in step 300 the remote device monitors the data traffic for an idle period that meets a predetermined threshold, as determined in step 310. If the threshold period is not me the device continues monitoring in step 300. If the threshold period is met, the device transitions into a dormant state as shown in step 320. During the dormancy period, the UDP socket remains open as shown in step 330 and the IP address remains unchanged. Advantageously, to the user it appears that the network connection is still active, although the radio link to the wireless network is in fact disabled and resources are being conserved and costs are being reduced.

Next, in step 340 the device monitors the data traffic to determine if there is data to be sent or received. If there is none, the device remains dormant but the UDP socket remains open. However, if in step 340 the device detects data traffic, either to be sent or to be received, the device deactivates the dormant state in step 350 by enabling the radio link between the remote device and the wireless network and then data communications ensue, as shown in step 360.

Figure 6:
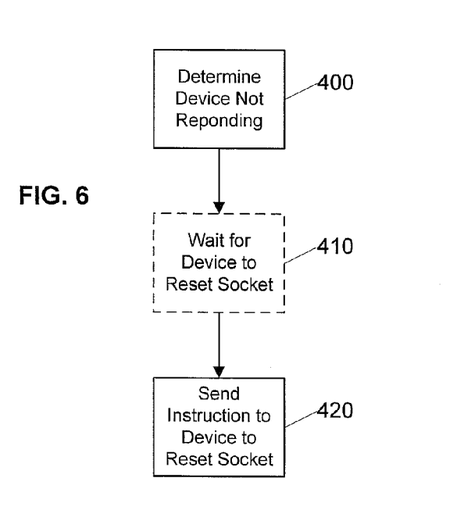
FIG. 6 is a flow diagram illustrating an example process for re-initializing a passive server according to an embodiment.

FIG. 6 is a flow diagram illustrating an example process for re-initializing a passive server according to an embodiment. In one embodiment, the process may be carried out by a server device such as the one previously described with respect to FIG. 1. Initially, in step 400 the server determines that the remote device is not responding to communications on the UDP socket. At this point, in step 410 the server may optionally wait for the remote device to resume communications on the UDP socket or to initialize a new UDP socket. For example, the server may have a predetermined period of time that it will wait for the remote device to respond after detecting that the remote device is not communicating on the UDP socket.

Next, in step 420, after the server has determined that the remote device is non-responsive, the server sends an instruction to the remote device to reset the UDP socket or initialize a new UDP socket. In one embodiment, the server may send an SMS message to the remote device with an instruction or a code that causes the remote device to close the corrupt or invalid socket and initialize a new UDP socket. Alternatively, the server may place a voice call to the remote device from a reserved caller identification number. When the remote device receives the call indicator from the reserved caller identification number, the call is dropped and a set of instructions associated with the reserved caller identification number are then executed by the remote device. In this instance, the set of instructions cause the remote device to close the corrupt or invalid socket and initialize a new UDP socket.

Figure 7:
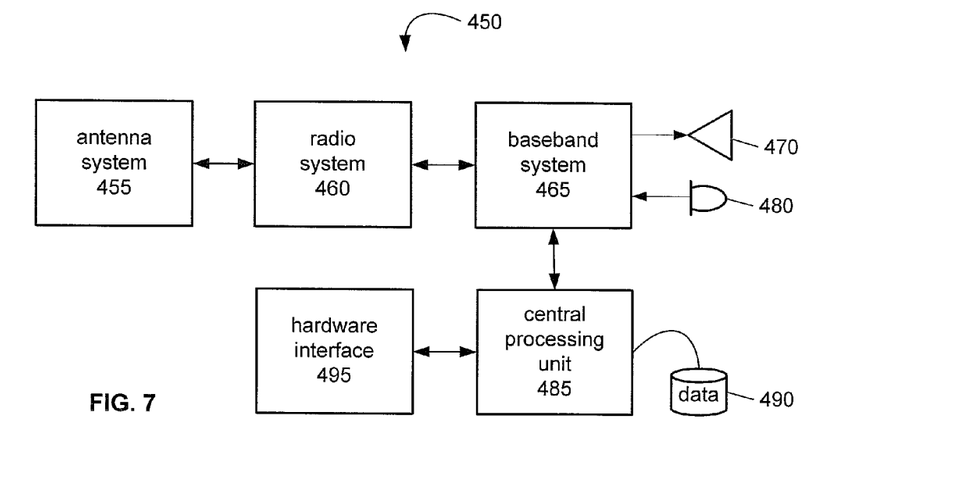
FIG. 7 is a block diagram illustrating an example wireless communication device that may be used in connection with various embodiments described herein.

FIG. 7 is a block diagram illustrating an example wireless communication device 450 that may be used in connection with various embodiments described herein. For example, the wireless communication device 450 may be used in conjunction with a remote device such as previously described with respect to FIG. 1. However, other wireless communication devices and/or architectures may also be used, as will be clear to those skilled in the art.

In the illustrated embodiment, wireless communication device 450 comprises an antenna system 455, a radio system 460, a baseband system 465, a speaker 464, a microphone 470, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communicate over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) that were previously described with respect to FIG. 2.

In this description, the term "computer readable medium" is used to refer to any media used to provide executable instructions (e.g., software and computer programs) to the wireless communication device 450 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 8:
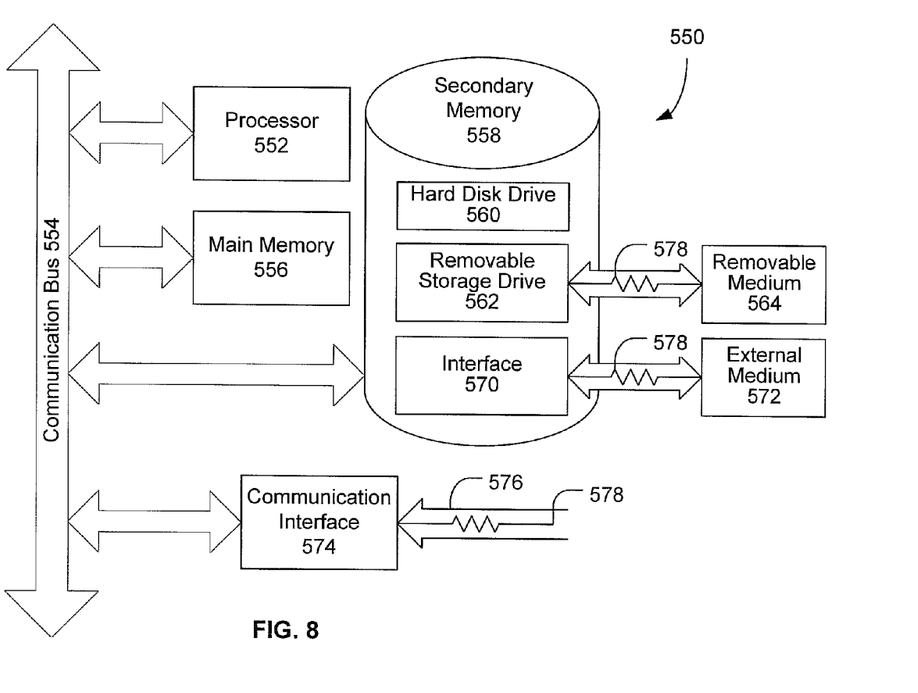
FIG. 8 is a block diagram illustrating an example computer system that may be used in connection with various embodiments described herein.

FIG. 8 is a block diagram illustrating an example computer system 550 that may be used in connection with various embodiments described herein. For example, the computer system 550 may be used in conjunction with a server computer such as that previously described with respect to FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A computer implemented method for wireless communication between a wireless communication device and a remote server communicatively coupled with the wireless communication device via a wireless communication network, comprising:
   establishing on the wireless communication device a user datagram protocol (UDP) socket between the wireless communication device and the remote server, the UDP socket used for data communications between the wireless communication device and the remote server;
   determining a minimum lease time for the UDP socket between the wireless communication device and the remote server;
   activating a dormancy state on the wireless communication device when the status of data communications between the wireless communication device and the remote server over a wireless communication link has been idle for a predetermined amount of time in accordance with said minimum lease time;
   maintaining the UDP socket as open on the wireless communication device during the dormancy state;
   identifying a data communication during the dormancy state;
   deactivating the dormancy state; and
   using the UDP socket for the identified data communication.

2. The method of claim 1, wherein the establishing step further comprises sending an internet protocol (IP) address of the wireless communication device to the remote server.

3. The method of claim 1, wherein the establishing step further comprises sending an electronic serial number (ESN) of the wireless communication device to the remote server.

4. The method of claim 1, wherein the establishing step further comprises receiving an acknowledgment message from the remote server.

5. The method of claim 1, wherein the activating step further comprises disabling a radio link between the wireless communication device and the wireless communication network.

6. The method of claim 1, wherein the deactivating step further comprises enabling the radio link between the wireless communication device and the wireless communication network.

7. The method of claim 1, wherein the deactivating step further comprises validating the connection status of the UDP socket.

8. The method of claim 1, wherein the deactivating step further comprises establishing a new UDP socket between the wireless communication device and the remote server.

9. A computer readable medium having stored thereon one or more sequences of instructions for causing one or more microprocessors to perform the steps for wireless communication between a wireless communication device and a remote server communicatively coupled with the wireless communication device via a wireless communication network, the steps comprising:
   establishing on the wireless communication device a user datagram protocol (UDP) socket between the wireless communication device and the remote server, the UDP socket used for data communications between the wireless communication device and the remote server;
   determining a minimum lease time for the UDP socket between the wireless communication device and the remote server;
   activating a dormancy state on the wireless communication device when the status of data communications between the wireless communication device and the remote server over a wireless communication link has been idle for a predetermined amount of time in accordance with said minimum lease time;
   maintaining the UDP socket as open on the wireless communication device during the dormancy state;
   identifying a data communication during the dormancy state;
   deactivating the dormancy state; and
   using the UDP socket for the identified data communication.

10. A computer implemented method for wireless communication between a wireless communication device and a remote server communicatively coupled with the wireless communication device via a wireless communication network, comprising:
   establishing on the wireless communication device a user datagram protocol (UDP) socket between the wireless communication device and the remote server, the UDP socket used for data communications between the wireless communication device and the remote server;
   determining a minimum lease time for the UDP socket between the wireless communication device and the remote server;
   activating a dormancy state on the wireless communication device when the status of data communications between the wireless communication device and the remote server over a wireless communication link has been idle for a predetermined amount of time in accordance with said minimum lease time;

maintaining the UDP socket as open on the wireless communication device during the dormancy state;

identifying a data communication during the dormancy state;

deactivating the dormancy state;

using the UDP socket for the identified data communication, and monitoring the wireless communication network for an instruction from the remote server to reset the UDP socket or to initialize a new UDP socket between the wireless communication device and the remote server; and resetting the UDP socket or initializing a new UDP socket in response to the instruction from the remote server to reset the UDP socket or to initialize a new UDP socket between the wireless communication device and the remote server.

* * * * *